(12) United States Patent
Furuse et al.

(10) Patent No.: US 12,257,766 B2
(45) Date of Patent: Mar. 25, 2025

(54) SHAPING APPARATUS AND SHAPING METHOD

(71) Applicant: MIMAKI ENGINEERING CO., LTD., Nagano (JP)

(72) Inventors: Masayuki Furuse, Nagano (JP); Shunta Hanaoka, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 230 days.

(21) Appl. No.: 17/776,225

(22) PCT Filed: Nov. 18, 2020

(86) PCT No.: PCT/JP2020/042915
§ 371 (c)(1),
(2) Date: May 12, 2022

(87) PCT Pub. No.: WO2021/106699
PCT Pub. Date: Jun. 3, 2021

(65) Prior Publication Data
US 2022/0379546 A1 Dec. 1, 2022

(30) Foreign Application Priority Data

Nov. 25, 2019 (JP) ................................. 2019-212531

(51) Int. Cl.
*B29C 64/112* (2017.01)
*B29C 64/209* (2017.01)
(Continued)

(52) U.S. Cl.
CPC .......... *B29C 64/112* (2017.08); *B29C 64/209* (2017.08); *B29C 64/218* (2017.08);
(Continued)

(58) Field of Classification Search
CPC ... B29C 64/112; B29C 64/194; B29C 64/209; B29C 64/218; B29C 64/236;
(Continued)

(56) References Cited

U.S. PATENT DOCUMENTS

| 8,177,350 B2† | 5/2012 | Mitsuzawa |
| 2017/0225500 A1* | 8/2017 | Miller ................... B41M 5/0047 |
| 2018/0071983 A1* | 3/2018 | Ochi ..................... B29C 64/393 |

FOREIGN PATENT DOCUMENTS

| JP | 2005504654 | 2/2005 |
| JP | 2018043408 | 3/2018 |
| JP | 2019199048 | 11/2019 |

OTHER PUBLICATIONS

"International Search Report (Form PCT/ISA/210) of PCT/JP2020/042915," mailed on Feb. 2, 2021, with English translation thereof, pp. 1-4.

\* cited by examiner
† cited by third party

*Primary Examiner* — Philip C Tucker
*Assistant Examiner* — Jimmy R Smith, Jr.
(74) *Attorney, Agent, or Firm* — JCIPRNET (57) ABSTRACT

A shaping apparatus includes an inkjet head forming one shaped layer by performing multiple main scans of ejecting an ink droplet of a curable ink that cures according to light of a predetermined wavelength toward a shaping table while reciprocating in a main scanning direction; a light source provided at least at one position on a front side in a forward or return direction in the main scan with respect to the inkjet head and irradiating an ink dot formed by the ink droplet with light; and a flattening unit flattening an upper surface of the ink dot. A shaped object is formed by layering the shaped layer. In the shaping apparatus, the ink dot is flatted by the flattening roller in the return movement without completely (Continued)

curing the ink dot by controlling the on/off state or illuminance of the light source during at least one of the main scans.

10 Claims, 6 Drawing Sheets

(51) Int. Cl.
    *B29C 64/218* (2017.01)
    *B29C 64/236* (2017.01)
    *B29C 64/277* (2017.01)
    *B29C 64/393* (2017.01)
    *B33Y 10/00* (2015.01)
    *B33Y 30/00* (2015.01)
    *B33Y 50/02* (2015.01)
    *B29K 105/00* (2006.01)

(52) U.S. Cl.
    CPC .......... *B29C 64/236* (2017.08); *B29C 64/277* (2017.08); *B29C 64/393* (2017.08); *B33Y 10/00* (2014.12); *B33Y 30/00* (2014.12); *B33Y 50/02* (2014.12); *B29K 2105/0032* (2013.01); *B29K 2995/002* (2013.01); *B29K 2995/0026* (2013.01)

(58) Field of Classification Search
    CPC ... B29C 64/277; B29C 64/282; B29C 64/214; B29C 64/188; B29C 64/343; B29K 2105/0032; B29K 2995/002; B29K 2995/0026; B33Y 10/00; B33Y 40/00; B33Y 30/00
    See application file for complete search history.

SHAPING APPARATUS AND SHAPING METHOD

CROSS-REFERENCE TO RELATED APPLICATION

This application is a 371 application of the International PCT application serial no. PCT/JP2020/042915, filed on Nov. 18, 2020, which claims the priority benefits of Japan Patent Application No. 2019-212531, filed on Nov. 25, 2019. The entirety of each of the above-mentioned patent applications is hereby incorporated by reference herein and made a part of this specification.

TECHNICAL FIELD

The present invention relates to a shaping apparatus and a shaping method

BACKGROUND ART

In recent years, a shaping apparatus for forming a three-dimensional object has been widely spread. As such a shaping apparatus, an apparatus has been developed that ejects ink to become a material of a shaped object using an inkjet head, cures the ejected ink with an ultraviolet ray or the like to form a layer of ink, and flattens the layer with a flattening roller to repeat layering and form a shaped object.

At the time of flattening by the flattening roller, a part of the cured ink may be scraped off, thus generating scraps. The scraps may contaminate the shaped object to be formed by adhering to the shaped object again, and the like. Therefore, it is required to suppress generation of scraps.

Here, in order to prevent the occurrence of a portion where the height in the layering direction becomes locally high, Patent Literature 1 discloses making ink that landed at a high position to easily move to a lower position by gravity without completely curing the ink, and making a region of the height that comes into contact with the flattening means difficult to be formed to prevent contact between the cured ink and the flattening means.

CITATION LIST

Patent Literature

Patent Literature 1: Japanese Unexamined Patent Publication No. 2018-43408

SUMMARY OF INVENTION

Technical Problems

However, in the method disclosed in Patent Literature 1, it is difficult to control the height of the ink in the layering direction by adjusting the curing state of the ink, and there is a possibility that the generation of scraps cannot be sufficiently suppressed.

The present invention thus provides a shaping apparatus and a shaping method that can easily suppress the amount of ink scraps generated at the time of flattening the upper surface of the ink dot.

Solutions to Problems

A shaping apparatus of the present invention includes an inkjet head that forms one shaped layer by performing a plurality of main scans of ejecting an ink droplet of a curable ink that cures according to light of a predetermined wavelength toward a shaping table while reciprocating in a main scanning direction defined in advance; a light source that is provided at least at one position on a front side in a forward direction or a return direction in the main scan with respect to the inkjet head and irradiates an ink dot formed by the ink droplet with the light; and
a flattening unit that flattens an upper surface of the ink dot; the shaping apparatus forming a shaped object by layering the shaped layer; where the ink dot is flatted by the flattening unit in the return movement without completely curing the ink dot by controlling the on/off state or illuminance of the light source at the time of at least one main scan among the plurality of main scans.

According to the present configuration, by controlling the on/off state or the illuminance of the light source, the upper surface of the ink dot before the ink dot is completely cured, that is, in a soft state is flattened by the flattening unit, so the amount of ink scraps generated at the time of flattening can be easily suppressed.

The shaping apparatus of the present invention further includes a first light source that is provided on a forward side in the main scanning direction with respect to the inkjet head and irradiates the ink dot formed by the landed ink droplet with the light, and
a second light source that is provided on a return side in the main scanning direction with respect to the inkjet head and irradiates the ink dot formed by the landed ink droplet with the light are further provided, where the second light source may not be turned on when the inkjet head ejects the ink droplet while moving forward. According to the present configuration, the generation of ink scraps can be easily suppressed since the upper surface of the ink dot in the non-cured state is flattened by the flattening unit.

The shaping apparatus of the present invention further includes a first light source that is provided on a forward side in the main scanning direction with respect to the inkjet head and irradiates the ink dot formed by the landed ink droplet with the light, and
a second light source that is provided on a return side in the main scanning direction with respect to the inkjet head and irradiates the ink dot formed by the landed ink droplet with the light, where
the second light source may be turned on at an illuminance the ink dot becomes a semi-cured state in at least one of the forward movement of the inkjet head and the return movement of the inkjet head. The semi-cured state is a cured state of an extent the ink dot that landed on the shaping table does not flow. According to the present configuration, the generation of ink scraps can be easily suppressed since the upper surface of the ink dot in a semi-cured state, which is a cured state of an extent the landed ink dot does not flow, is flattened by the flattening unit.

According to the shaping apparatus of the present invention, in at least the last reciprocating movement in the main scanning direction with respect to each position of the shaped layer, the ink dot is not completely cured by controlling the on/off state or the illuminance of the second light source, and the ink dot may be cured by the first light source after the ink dot is flattened by the flattening unit in the return movement.

Flattening the ink dots without completely curing the ink dots can also be a factor of the occurrence of smear in the color of the shaped object. In the formation of the shaped object by a plurality of main scans, the smearing of the color may become more apparent if the ink dot is flattened before the ink dot is completely cured. According to this configuration, for example, in the case of multi-pass (four paths) in which the inkjet head reciprocates two times, the cured ink dot of the first pass and the ink dot of the second pass in the non-cured state are flattened by the flattening unit. On the other hand, in the third pass and the fourth pass, the ink dot is flattened without completely curing the ink dot, and then the ink dot is cured. Thus, even when the shaped object is formed through the multi-pass method, the generation of ink scraps of the shaped object can be easily suppressed while suppressing the smearing of the color of the shaped object.

In the shaping apparatus of the present invention, after the flattening unit flattens the ink dot in the return movement, the ink dot is cured by the light source.

According to the shaping apparatus of the present invention, the forward movement or the return movement of the main scan is performed at least three times or more with respect to each position of the shaped layer.

In the shaping apparatus of the present invention, the inkjet head may uniformly eject a clear ink with respect to the shaped object so as to compensate for a layering amount by a color ink for coloring and forming the shaped object, and the compensation amount of the clear ink by one ejection from the inkjet head may be an amount smaller than a maximum amount of the color ink by one ejection from the inkjet head.

The amount of color ink by one ejection decreases as the color density of the shaped object decreases. Therefore, a portion where the color density is low may not satisfy the predetermined layering height with only the color ink. Thus, the clear ink, which is a colorless and transparent ink, is ejected in order to compensate for the small amount of color ink. However, calculating the compensation amount of the clear ink for every ejection of the color ink is not performed because the arithmetic processing takes time, and the compensation amount of the clear ink is uniform with respect to the shaped object. For this reason, conventionally, the compensation amount of the clear ink is prevented from becoming insufficient even at the portion where the density is low by making the compensation amount of the clear ink by one ejection the same amount as the maximum amount of the color ink by one ejection.

However, in the shaping by the multi-pass method as well, when the compensation amount of the clear ink is the same as the maximum amount of the color ink as in the related art, it has been found that the amount of generation of scraps at the time of flattening by the flattening unit is larger than those when the multi-pass method is not performed.

It has been confirmed that the amount of scraps can be suppressed and defects do not occur in the formed shaped object by making the compensation amount of the clear ink less than the maximum amount of the color ink. Therefore, according to the present invention, the generation of ink scraps of the shaped object can be easily suppressed in forming the shaped object through the multi-pass method.

In the shaping apparatus of the present invention, the compensation amount of the clear ink may be a value obtained by subtracting an amount of ink scraped off by the flattening unit from the shaped object formed with the compensation amount of the clear ink set to an amount same as the maximum amount of the color ink, from the maximum amount of the color ink.

The amount of ink scraped off by the flattening unit is considered to be an excessive amount of clear ink when the shaped object is formed with an amount same as the maximum amount of the color ink by one ejection set as the compensation amount of the clear ink. Thus, in the present configuration, the amount of ink scraped off from the shaped object formed with the compensation amount of the clear ink set as the same amount as the maximum amount of the color ink is obtained, and a value obtained by subtracting this amount of ink from the maximum amount of color ink is set as the compensation amount of the clear ink. Thus, the generation of ink scraps of the shaped object can be easily suppressed without causing defects in the shaped object.

A shaping method of the present invention is a shaping method by a shaping apparatus including an inkjet head that forms one shaped layer by performing a plurality of main scans of ejecting an ink droplet of a curable ink that cures according to light of a predetermined wavelength toward a shaping table while reciprocating in a main scanning direction defined in advance; a light source that is provided at least at one position on a front side in a forward direction or a return direction in the main scan with respect to the inkjet head and irradiates an ink dot formed by the ink droplet with the light; and a flattening unit that flattens an upper surface of the ink dot; where the flattening unit flattens the ink dot in the return movement without completely curing the ink dot by controlling the on/off state or illuminance of the light source at the time of at least one main scan among the plurality of main scans.

Effect of the Invention

The present invention can easily suppress the amount of ink scraps generated at the time of flattening the upper surface of the ink dot.

DESCRIPTION OF EMBODIMENTS

Hereinafter, a shaping method and a shaping apparatus according to embodiments of the present invention will be described with reference to the drawings.

First Embodiment

Figure 1:
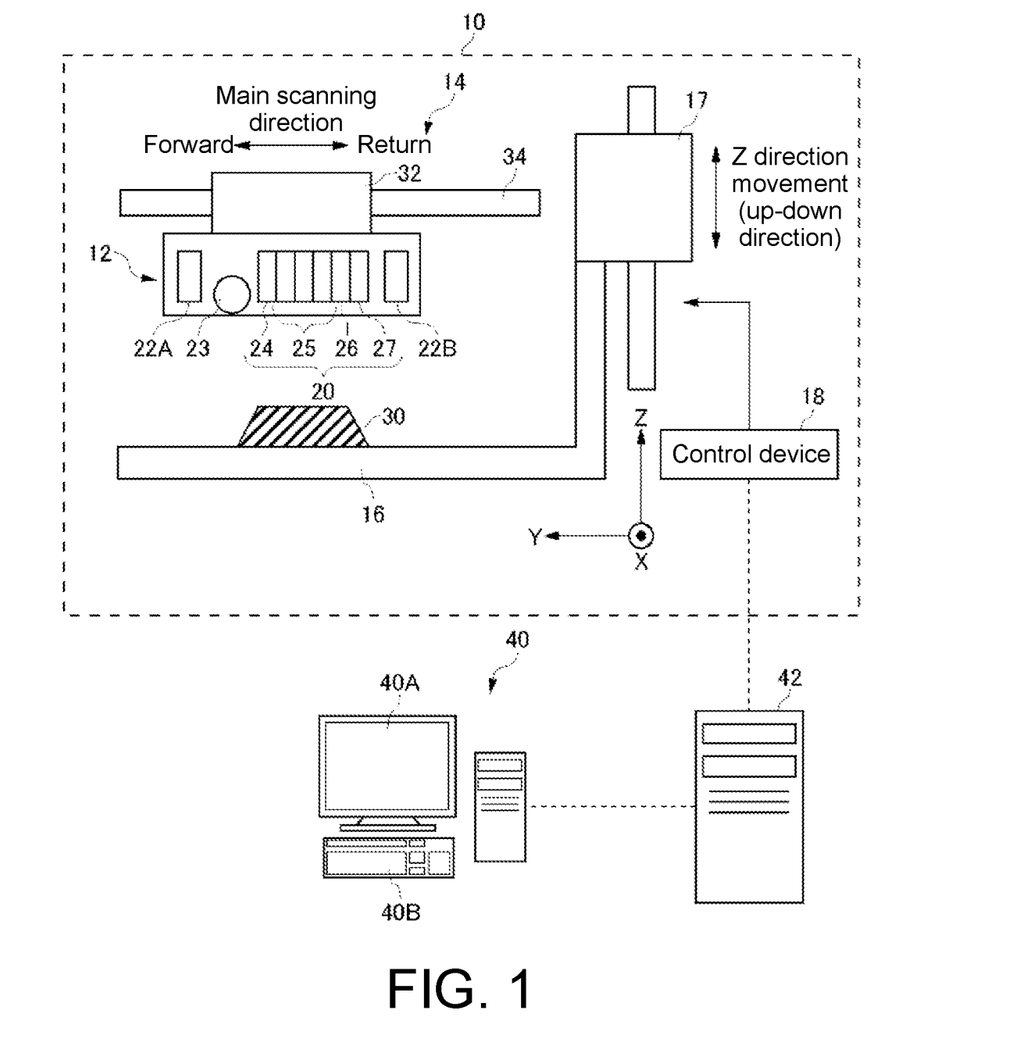
FIG. 1 is a schematic configuration view of a shaping apparatus according to a first embodiment.

FIG. 1 is a view showing a configuration of a shaping apparatus 1 of the present embodiment. As an example, the shaping apparatus 1 is configured as a system including a 3D printer 10, a user PC 40, and a control PC 42.

The 3D printer 10 of the present embodiment is a 3D printer of an inkjet method that includes an ejection unit 12, a main scanning driving unit 14, a shaping table 16, a movable unit 17, and a control device 18, and that shapes a three-dimensional shaped object 30 by solidifying and layering droplets of curable resin ejected from the ejection unit 12.

The ejection unit 12 ejects the material of the shaped object 30, and layers the layers constituting the shaped object 30 one by one to form the shaped object 30 on the shaping table 16. More specifically, the ejection unit 12 includes an inkjet head 20 that ejects ink droplets containing various types of ink to be a material of the shaped object 30 and a support material toward the shaping table 16, a left light source 22A and a right light source 22B that irradiate an ink dot formed by the ink droplets that landed on the shaping table 16 with light of a predetermined wavelength to cure the ink dot, and a flattening roller 23 that flattens an upper surface (hereinafter referred to as a "layered surface") of the ink dot formed during the shaping of the shaped object 30.

The inkjet head 20 of the present embodiment includes a support material head 27 that ejects the support material, in addition to a white ink head 24 that ejects white ink, which is a model material, a color ink head 25 that ejects color ink, and a clear ink head 26 that ejects clear ink. In FIG. 1, three color ink heads 25 are shown, but the number of color ink heads 25 can be an appropriate number depending on the number of types of ink to use.

As will be described in detail later, the ejection unit 12 ejects ink droplets while reciprocating in a left-right direction in the plane of drawing of FIG. 1 along the main scanning direction (Y direction). Note that movement from right to left in the plane of drawing of FIG. 1 is referred to as forward movement, and movement from left to right in the plane of drawing of FIG. 1 is referred to as return movement.

Describing the arrangement positions of the respective components included in the ejection unit 12 with reference to the main scanning direction, the left light source 22A is provided on the forward advancing direction side in the main scanning direction with respect to the inkjet head 20, and the right light source 22B is provided on the return advancing direction side in the main scanning direction with respect to the inkjet head 20. Furthermore, the flattening roller 23 is provided between the left light source 22A and the inkjet head 20. When the left light source 22A and the right light source 22B are not distinguished from each other, they are simply referred to as the light source 22.

The light of a predetermined wavelength emitted from the light source 22 to the ink dot is, by way of example, an ultraviolet light. That is, the ink droplet ejected from the inkjet head 20 is an ultraviolet curable ink that cures according to the ultraviolet light.

The ejection unit 12 of the present embodiment forms each layer constituting the shaped object 30 by, for example, ejecting and curing ink droplets of a curable resin, which cures by irradiation of ultraviolet light. More specifically, the ejection unit 12 repeatedly performs, over plural times, a layer forming operation of forming a layer of curable resin by ejecting ink droplets in accordance with an instruction of the control device 18, and a curing operation of curing the layer of curable resin formed in the layer forming operation to form the shaped object 30.

The 3D printer 10 colors and forms the shaped object 30 by ejecting the color ink from the color ink head 25 and layering the same, where the amount of color ink ejected from the color ink head 25 (hereinafter referred to as "color ink amount") changes according to the density of the color of the shaped object 30 (hereinafter referred to as "color density".). That is, since the amount of color ink forming the portion having a low color density is small, there is a possibility that the predetermined layering height may not be satisfied only with the color ink in such a portion. Thus, the 3D printer 10 ejects the clear ink from the clear ink head 26 so as to compensate for the layering amount by the color ink. The inkjet head 20 of the present embodiment uniformly ejects a predetermined amount of clear ink on the shaped object 30 for compensation.

As an example, the shaped object 30 of the present embodiment is configured by a color layer that colors and forms the shaped object 30, a reflection layer that forms a lower layer of the color layer, and an inner layer that forms a lower layer of the reflection layer. The reflection layer and the inner layer are collectively referred to as a shaped layer. The color layer is formed of color ink. On the other hand, the reflection layer and the inner layer are formed with a single color such as white ink, for example, but the reflection layer and the inner layer may be formed with inks of different colors, respectively.

Since the reflection layer and the inner layer are formed of monochromatic ink, the layering height does not change according to the density. Therefore, the 3D printer 10 of the present embodiment compensates for the clear ink with respect to the color layer, but does not compensate for the clear ink with respect to the reflection layer and the inner layer.

The scanning driving unit 14 is a driving unit that relatively moves the ejection unit 12 with respect to the shaped object 30 (hereinafter referred to as "scanning operation"). The scanning driving unit 14 causes the ejection unit 12 to perform a main scan (Y scan) and a sub scan (X scan) as the scanning operation. Furthermore, the main scan is, for example, an operation in which the ejection unit 12 ejects ink droplets while moving in a main scanning direction (Y direction in the drawing) set in advance.

The main scanning driving unit 14 includes a carriage 32 and a guide rail 34. The carriage 32 is a holding portion that holds the ejection unit 12 so as to face the shaping table 16. That is, the carriage 32 holds the ejection unit 12 so that the ejecting direction of the ink droplets is in the direction toward the shaping table 16. Furthermore, during the main scan, the carriage 32 is moved along the guide rail 34 while holding the ejection unit 12. The guide rail 34 is a rail-like member that guides the movement of the carriage 32, and moves the carriage 32 in accordance with an instruction of the control device 18 at the time of the main scan.

The movement of the ejection unit 12 at the time of the main scan may be a relative movement with respect to the shaped object 30. For example, the shaped object 30 may be moved by fixing the position of the ejection unit 12 and moving the shaping table 16.

The movable unit 17 is a conveying mechanism that changes a distance between the ejection unit 12 and the shaping table 16. The upper surface of the shaping table 16 of the present embodiment is moved in the up-down direction (Z direction in FIG. 1) by the movable unit 17. The upper surface of the shaping table 16 moves in accordance with the progress of the shaping of the shaped object 30 according to an instruction from the control device 18. A distance (gap) between the layering surface in the shaped object 30 in the middle of shaping and the ejection unit 12 is thus appropriately adjusted. Here, the layering surface of the shaped object 30 is, for example, a surface on which the next layer is formed by the ejection unit 12. The distance between the ejection unit 12 and the shaping table 16 may be adjusted by moving the ejection unit 12 side up and down.

The control device 18 is, for example, a central processing unit (CPU) of the 3D printer 10, and controls the operation of shaping of the shaped object 30 by controlling each unit of the 3D printer 10 based on slice data indicating shape information of the shaped object 30 to be shaped, color image information, and the like.

The user PC 40 is an information processing device including a display device 40A and an input device 40B configured by a keyboard, a mouse, and the like. The user PC 40 of the present embodiment transmits 3D model data indicating the shaped object 30 in a predetermined format to the control PC 42 as a shaping job. The 3D model data is data indicating the shape of the shaped object 30, the surface color thereof, and the like and for example, is created based on 3D CAD data, data of the outer appearance in which the shaped object 30 to be manufactured is photographed, and the like.

The control PC 42 is an information processing device that controls the 3D printer 10, and receives a shaping job from the user PC 40. The control PC 42 generates the slice data corresponding to the cross-section of each position of the shaped object 30 based on the shaping job (3D model data) received from the user PC 40. Then, the control PC 42 transmits slice data corresponding to each position to the 3D printer 10. In the example of FIG. 1, one 3D printer 10 is connected to the control PC 42, but this is an example, and a plurality of 3D printers 10 may be connected to the control PC 42.

Note that the user PC 40 and the control PC 42 include, for example, a CPU that performs arithmetic processing, a read only memory (ROM) that stores programs and various data in advance, a random access memory (RAM) used as a work area of the CPU, and a storage device such as a hard disk drive (HDD) that stores various information, and transmit and receive various data to and from another information processing device or the 3D printer 10.

The inkjet head 20 of the present embodiment carries out the formation of the shaped object 30 through a multi-pass method of performing a main scan of ejecting ink droplets while moving in the main scanning direction (Y direction) over a plurality of times with respect to each position of the region to be shaped where the shaped object 30 is to be formed on the shaping table 16. More specifically, the ejection of ink droplets in the forward movement of the inkjet head 20 in the first main scan is defined as a first pass, the ejection of ink droplets in the return movement is defined as a second pass, and the forward movement and the return movement in the second main scan are defined as a third pass and a fourth pass, respectively. Thus, one main scan (forward movement or return movement) corresponds to one pass, and the inkjet head 20 forms one shaped layer by performing the main scan a plurality of times.

As described above, the multi-pass method enables formation of the shaped object 30 with higher definition by forming three or more ink dots for each position of the region to be shaped. The multi-pass of the present embodiment is, as an example, four passes in which the main scan is performed two times and the ink droplet is ejected four times with respect to each position of the region to be shaped.

Figure 2:
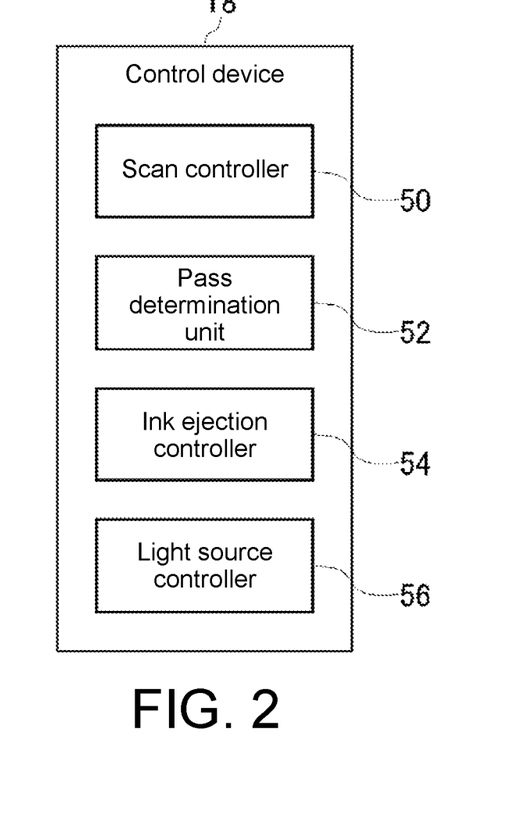
FIG. 2 is a functional block diagram relating to a shaping process of the first embodiment.

FIG. 2 is a functional block diagram related to the shaping process executed by the 3D printer 10 of the present embodiment. The control device 18 included in the 3D printer 10 includes a scan controller 50, a pass determination unit 52, an ink ejection controller 54, and a light source controller 56.

The scan controller 50 controls driving of the scanning driving unit 14 and the movable unit 17 so that the ejection unit 12 moves in the main scanning direction (Y direction) and the sub-scanning direction (X direction) and the shaping table 16 moves in the up-down direction (Z direction).

The pass determination unit 52 determines the moving state (forward movement or return movement) of the ejection unit 12 in the main scanning direction, in other words, the current pass number of the inkjet head 20 that is moving in the main scanning direction while ejecting ink droplets.

The ink ejection controller 54 controls the inkjet head 20 to eject ink droplets based on the slice data transmitted from the control PC 42.

The light source controller 56 controls the lighting states of the left light source 22A and the right light source 22B according to the moving state of the ejection unit 12 in the main scanning direction.

Here, since the shaping apparatus 1 of the present embodiment compensates for the clear ink with respect to the color ink, the height of the ink layer formed by the ink dot tends to become higher than the reference value. Furthermore, the height of the ink layer may become higher than the reference value due to a part of the adjacent ink dots overlapping each other.

Therefore, when the layering surface is flattened by the flattening roller 23, the excess ink is cured and then scraped off by the flattening roller 23 to generate scraps. The scraps may contaminate the shaped object 30 to be formed by adhering to the shaped object 30 again, and the like. Therefore, it is required to suppress generation of scraps.

Furthermore, in the multi-pass (four passes) in which the main scan is performed twice, equal to or more than twice the scraps were generated as compared with the case (two passes) of forming the shaped object 30 by performing the main scan once. That is, it has been newly found that the larger the pass number in the multi-pass, the larger the amount of generation of the scraps.

Therefore, the shaping apparatus 1 of the present embodiment carries out the light irradiation of curing the ink dot by the left light source 22A after the flattening roller 23 flattens the ink dot in the return movement without completely curing the ink dot by controlling the flashing state of the right light source 22B. Accordingly, since the layering surface of the ink dot before the ink dot is completely cured, that is, in a soft state is flattened by the flattening roller 23, the amount of ink scraps generated at the time of flattening can be easily suppressed.

Figure 3:
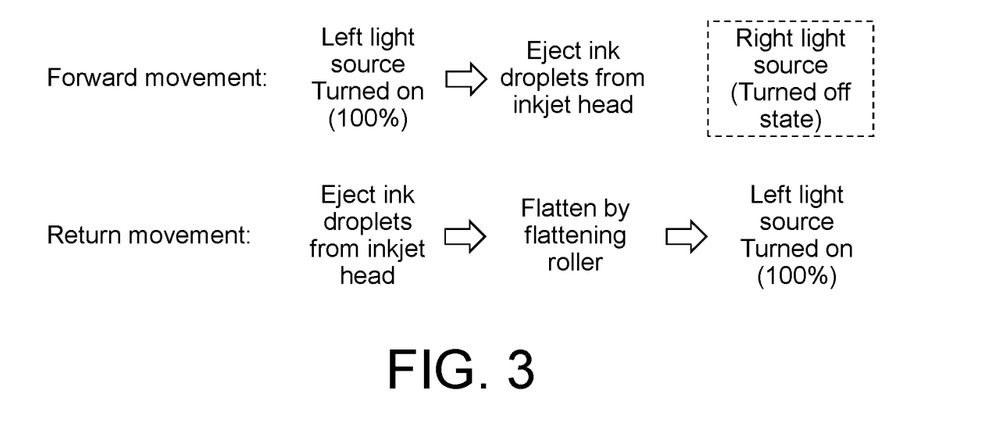
FIG. 3 is a schematic view illustrating a flow of light irradiation and flattening process of the first embodiment.

FIG. 3 is a schematic view illustrating a flow of light irradiation and flattening process of the present embodiment. In the light irradiation and flattening process of the present embodiment, the right light source 22B is not turned on when the inkjet head 20 ejects the ink droplets while reciprocating. That is, the right light source 22B is turned off even in the return movement as well as the forward movement of the inkjet head 20. In the case of the multi-pass method, the forward movement corresponds to an odd-numbered pass, and the return movement corresponds to an even-numbered pass.

As shown in FIG. 3, in the forward movement of the inkjet head 20, the ink droplets are ejected from the inkjet head 20 while the left light source 22A is turned on with the illuminance of 100%, but the right light source 22B is turned off. As a result, the ink dot formed by the ink droplet ejected in the forward movement remains in the non-cured state, and the return movement is performed when the inkjet head 20 reaches the left end in the main scanning direction. The illuminance of 100% is illuminance that can completely cure the ink dot.

Furthermore, the reason why the left light source 22A is turned on with the illuminance of 100% in the forward movement is to completely cure the ink dot of the lower layer by the turning on of the light source because there is a possibility that the curing of the ink dot layered on the lower layer of the ink dot formed by the ejection is not sufficient. Therefore, it is not always necessary to turn on the left light source 22A in the forward movement. Since the flattening roller 23 is arranged on the left side (front side in the advancing direction of the forward movement) of the inkjet head 20, it does not act on the ink dot formed by the forward movement.

Furthermore, even in the return movement of the inkjet head 20, the right light source 22B is turned off, and ink droplets are ejected from the inkjet head 20. As a result, the ink dots formed by the ink droplets ejected in the forward movement and the return movement remain in the non-cured state, and the layering surface of the ink dot in the non-cured state is flattened by the flattening roller 23. Thereafter, the ink dot is cured by the left light source 22A turned on at 100%.

According to such light irradiation and flattening process, since the layering surface of the ink dot in the non-cured state is flattened by the flattening roller 23, the generation of ink scraps can be easily suppressed.

The light irradiation and flattening process of the present embodiment may be applied not only to the formation of the shaped object 30 by the multi-path method but also to the case of forming the shaped object 30 by one main scan (two paths).

Figure 4:
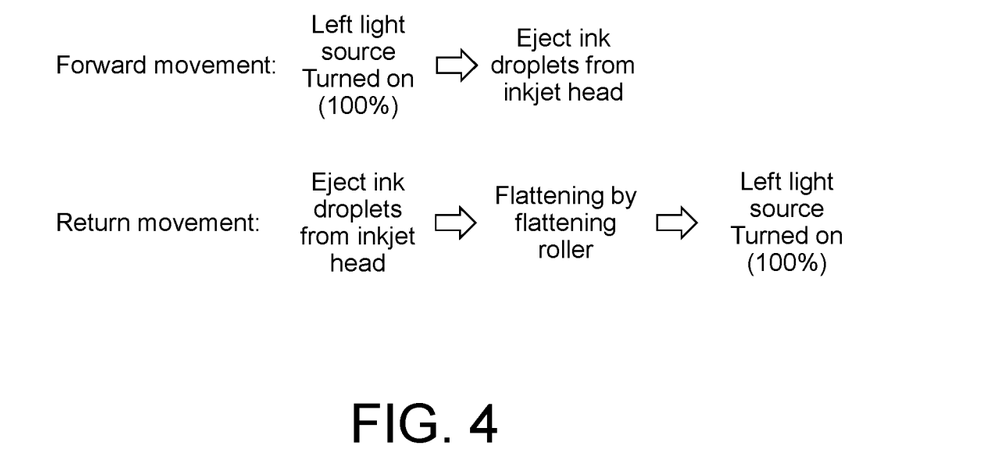
FIG. 4 is a schematic view illustrating a flow of light irradiation and flattening process according to a modified example of the first embodiment.

In the present embodiment, a mode in which the ejection unit 12 includes two light sources 22 (the left light source 22A and the right light source 22B) has been described, but the present invention is not limited thereto. The light source 22 may be provided at least at one location on the front side of the main scan with respect to the inkjet head 20. For example, as the light source 22, only the left light source 22A may be provided without providing the right light source 22B. In this mode, as illustrated in FIG. 4, the ejection unit 12 does not include the right light source 22B, and thus control for turning off the right light source 22B is not included, and only the flashing control of the left light source 22A is performed.

Second Embodiment

A second embodiment of the present invention will be described. Since the configuration of the shaping apparatus 1 of the present embodiment is similar to the configuration of the shaping apparatus 1 of the first embodiment, the description will be omitted.

Figure 5:
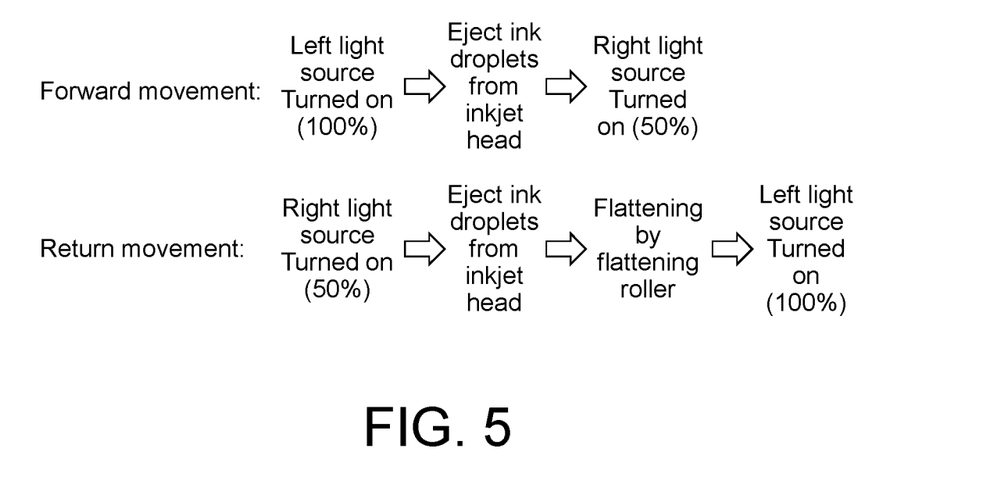
FIG. 5 is a schematic view illustrating a flow of light irradiation and flattening process of a second embodiment.

In the light irradiation and flattening process of the present embodiment, the right light source 22B is turned on at an illuminance at which the ink dot becomes a semi-cured state in at least one of the forward movement of the inkjet head 20 and the return movement of the inkjet head 20. In other words, the right light source 22B irradiates the ink dots with ultraviolet light of weak illuminance that is light reduced as compared with the state where the illuminance is 100%. According to such light irradiation and flattening process, since the layering surface of the ink dot in the semi-cured state, which is a cured state of an extent the landed ink dot does not flow, is flattened by the flattening roller 23, the generation of ink scraps can be easily suppressed.

FIG. 5 is a schematic view illustrating a flow of light irradiation and flattening process of the present embodiment. As shown in FIG. 5, in the light irradiation and flattening process of the present embodiment, the illuminance of the right light source 22B is set to 50% in the forward movement and the return movement. As a result, the ink dot formed by the ink droplets ejected in the forward movement is in the semi-cured state, and the layering surface of the ink dots is flattened by the flattening roller 23. On the other hand, the ink dot formed by the ink droplets ejected in the return movement is flattened in the non-cured state.

The illuminance of the right light source 22B illustrated in FIG. 5 is an example, and for example, the illuminance of the right light source 22B may be less than 50% as long as the ink dot is not completely cured, or the illuminance may be differed between the forward movement and the return movement. In addition, the right light source 22B merely needs to be turned on in at least one of the forward movement and the return movement, and for example, the right light source 22B may be turned on in the forward movement, and the right light source 22B may be turned off in the return movement, or the right light source 22B may be turned off in the forward movement, and the right light source 22B may be turned on in the return movement.

Third Embodiment

A third embodiment of the present invention will be described. Since the configuration of the shaping apparatus 1 of the present embodiment is similar to the configuration of the shaping apparatus 1 of the first embodiment, the description will be omitted.

Flattening the layering surface of the ink dots without completely curing the ink dots as in the first embodiment and the second embodiment can also be a factor of the occurrence of smear in the color of the shaped object 30. In the formation of the shaped object 30 by the multi-path method, if the ink dot is flattened before the ink dot is completely cured, the smearing of the color may become more apparent.

Figure 6:
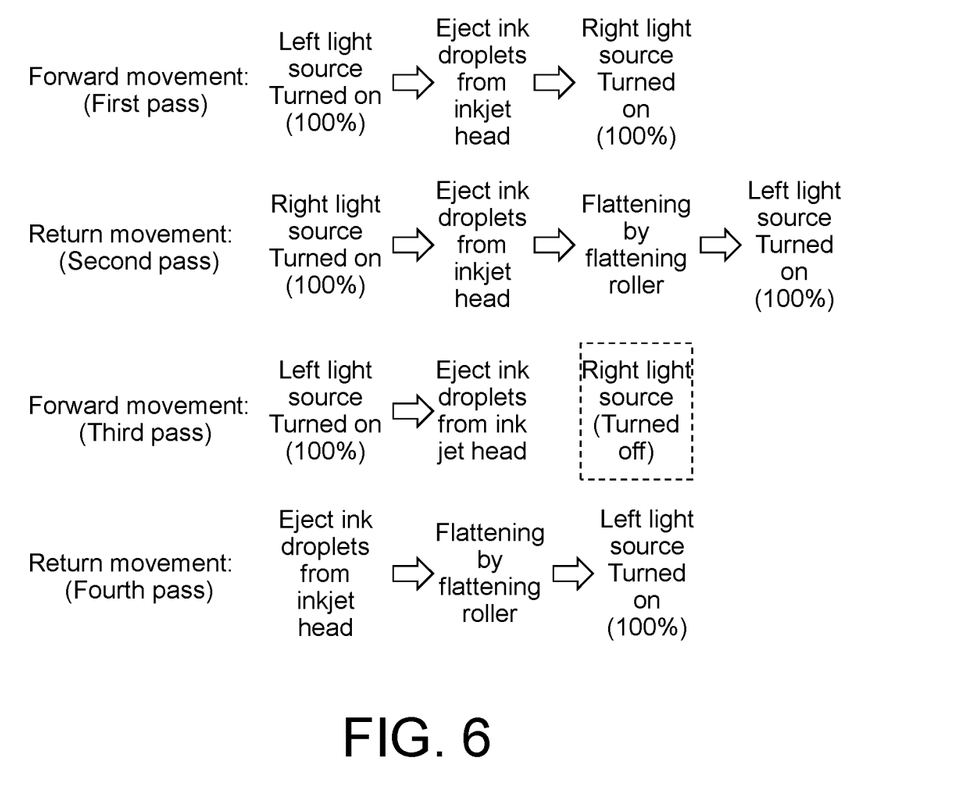
FIG. 6 is a schematic view illustrating a flow of light irradiation and flattening process of a third embodiment.

Therefore, according to the light irradiation and flattening process of the present embodiment, in at least the last reciprocating movement in the main scanning direction of the inkjet head 20 in the multi-path method, the ink dot is not completely cured by controlling the flashing state of the right light source 22B and the ink dot is cured by the left light source 22A after the ink dot is flattened by the flattening roller 23 in the return movement.

FIG. 6 illustrates a flow of light irradiation and flattening processing in the multi-path method (four paths) of the present embodiment.

As shown in FIG. 6, in the reciprocating movement in the main scanning direction of the inkjet heads 20 of the first pass and the second pass (first main scan), the right light source 22B is also turned on together with the left light source 22A. Thus, the cured ink dot of the first pass and the ink dot in the non-cured state of the second pass are flattened by the flattening roller 23. On the other hand, in the third path and the fourth path, which are the second main scan, the right light source 22B is turned off. Thus, the ink dot in the non-cured state is flattened by the flattening roller 23 and then cured by the left light source 22A.

According to such light irradiation and flattening process, it was confirmed that even when forming the shaped object 30 by the multi-path method, the generation of ink scraps of the shaped object 30 can be easily suppressed while suppressing the smearing of the color of the shaped object 30.

In the third and fourth paths, as in the second embodiment, the right light source 22B may be turned on with reduced illuminance to have the ink dots in the semi-cured state.

Furthermore, in the light irradiation and flattening process of the present embodiment, the ink dots may be flattened by the flattening roller 23 without being completely cured at least in the last main scan, and thus, for example, in the multi-path method of six paths in which the main scan is repeated three times, the ink dots may be flattened by the flattening roller 23 without being completely cured in the main scan of only the fifth and sixth paths or the third to sixth paths. The same applies to a multi-path method of eight or more paths in which the main scan is repeated four or more times.

Figure 7:
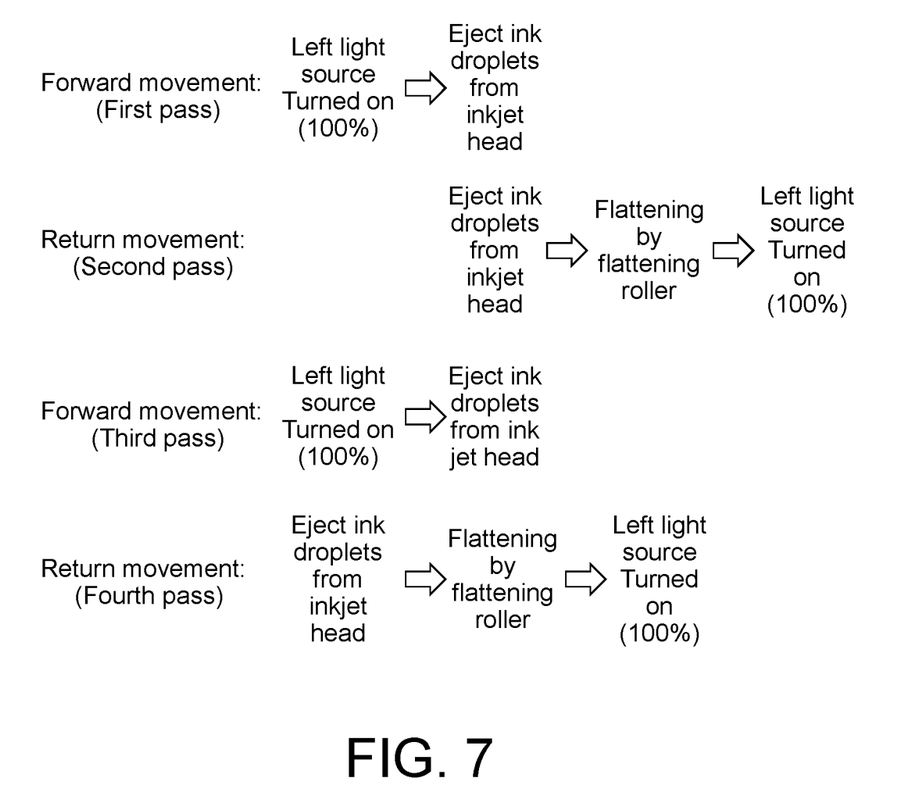
FIG. 7 is a schematic view illustrating a flow of light irradiation and flattening process according to a modified example of the third embodiment.

In the present embodiment, a mode in which the ejection unit 12 includes two light sources 22 (the left light source 22A and the right light source 22B) has been described, but the present invention is not limited thereto. The light source 22 may be provided at least at one location on the front side of the main scan with respect to the inkjet head 20. For example, as the light source 22, only the left light source 22A may be provided without providing the right light source 22B. In this mode, as illustrated in FIG. 7, the ejection unit 12 does not include the right light source 22B, and thus control for turning on or off the right light source 22B is not included, and only the flashing control of the left light source 22A is performed.

Fourth Embodiment

A fourth embodiment of the present invention will be described. Since the configuration of the shaping apparatus 1 of the present embodiment is similar to the configuration of the shaping apparatus 1 of the first embodiment, the description will be omitted.

As described above, the amount of color ink by one ejection decreases as the color density of the shaped object 30 decreases. Therefore, a portion where the color density is low may not satisfy the predetermined layering height with only the color ink. The thickness of one shaped layer is about 20 microns to 40 microns, and the shortage of ink is inconspicuous when the number of shaped layers is small. However, when 100 or more shaped layers are overlapped, the ink shortage becomes conspicuous, and a defect such as distortion of a part of the shaped object 30 occurs. Thus, the clear ink, which is a colorless and transparent ink, is ejected in order to compensate for the small amount of color ink. However, calculating the compensation amount of the clear ink for every ejection of the color ink is not performed because the arithmetic processing takes time, and the compensation amount of the clear ink is uniform with respect to the shaped object 30. For this reason, conventionally, the compensation amount of the clear ink is prevented from becoming insufficient even at the portion where the density is low by making the compensation amount of the clear ink by one ejection the same amount as the maximum amount of the color ink by one ejection.

However, in the shaping by the multi-pass method as well, when the compensation amount of the clear ink is the same as the maximum amount of the color ink as in the related art, it has been found that the amount of dragging of the excess ink to be scraped to the other ink region and the amount of generation of scraps at the time of flattening by the flattening roller 23 are larger than those when the multi-pass method is not performed.

Therefore, in the shaping apparatus 1 of the present embodiment, the compensation amount of the clear ink is set to an amount smaller than the maximum amount of the color ink. As a result, it was confirmed that the amount of dragging of the ink and the amount of generation of scraps at the time of flattening was suppressed, and no defect occurred in the shaped object 30 to be formed.

Next, an example of a method of determining the compensation amount of the clear ink will be described. First, the shaped object 30 is formed with the compensation amount of the clear ink same as the maximum amount of color ink (color ink amount when density of the color is the darkest) by one ejection. The compensation amount of the clear ink at this time is defined as 100%. The amount of ink scraped off by the flattening roller 23 from the shaped object 30 formed with the compensation amount of clear ink set to 100% is considered to be an excessive amount of clear ink.

Therefore, the inventor conducted an experiment of forming the shaped object 30 by reducing the compensation amount of the clear ink from 100% to 80% when the actual measurement value of the amount of ink scraped by the flattening roller 23 is 20% of the amount of ink ejected from the inkjet head 20. As a result, the generation amount of ink scraps in the shaped object 30 can be reduced as compared with the conventional art without causing defects in the shaped object 30.

The generation amount of scraps becomes smaller as the compensation amount of the clear ink becomes smaller. On the other hand, if the compensation amount of the clear ink is too small, for example, a portion where the ink is insufficient becomes significant as the layers are overlapped, and defects occur in the shaped object 30 to be formed such as distortion may occur in the shaped object 30. However, as described above, the generation amount of ink scraps of the shaped object 30 can be reduced without causing defects in the shaped object 30 by setting the compensation amount of the clear ink to less than 100% based on the amount of ink scraped by the flattening roller 23 from the shaped object 30 formed with the compensation amount of the clear ink of 100%.

Thus, in the present embodiment, the amount of ink scraped off by the flattening roller 23 from the shaped object 30 formed with the compensation amount of the clear ink of 100% is obtained, and a value obtained by subtracting this amount of ink from the maximum amount of color ink is set as the compensation amount of the clear ink. Note that the compensation amount of the clear ink set to 80% in the present embodiment is an example, and may be different according to the type of the shaped object 30 to be formed or the 3D printer 10. For example, when forming the shaped object 30 having a high color density as a whole, the compensation amount of the clear ink may be a value lower than 80%.

Figure 8:
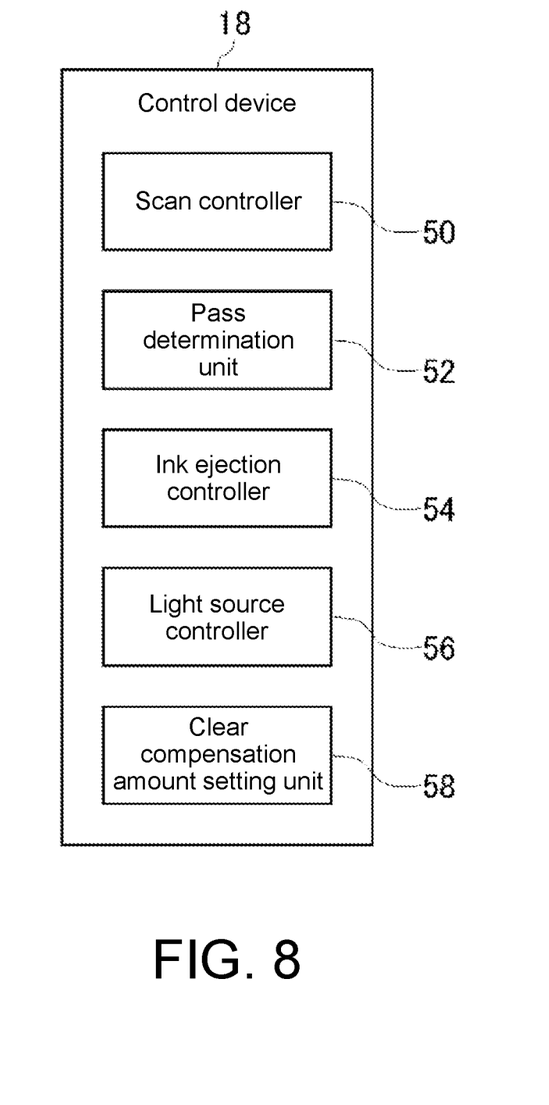
FIG. 8 is a functional block diagram relating to a shaping process of a fourth embodiment.

FIG. 8 is a functional block diagram related to the shaping process executed by the 3D printer 10 of the present embodiment. The components in FIG. 8 same as those in FIG. 2 are denoted with the same reference numerals as FIG. 2, and descriptions thereof will be omitted.

The control device 18 of the present embodiment includes a clear compensation amount setting unit 58 together with the scan controller 50, the pass determination unit 52, the ink ejection controller 54, and the light source controller 56.

The clear compensation amount setting unit 58 receives and stores, for example, the compensation amount of the clear ink input via the user PC 40 as a set value. Then, the ink ejection controller 54 controls the inkjet head 20 to eject the clear ink of the compensation amount set by the clear compensation amount setting unit 58.

As described above, the present invention has been described using the embodiments described above, but the technical scope of the present invention is not limited to the scope described in the above embodiments. Various changes or improvements can be added to the embodiments described above without departing from the scope of the invention, and a mode in which changes or improvements are added is also encompassed within the technical scope of the present invention. The embodiments described above may be appropriately combined.

In the embodiments described above, a mode in which light of a predetermined wavelength emitted from the light source 22 is ultraviolet light has been described, but the present invention is not limited thereto. For example, as long as the photocurable ink (resin) can be cured, the light source 22 may emit light of other wavelengths such as infrared light.

In the embodiments described above, a mode in which the shaping apparatus 1 is configured as a system including the 3D printer 10, the user PC 40, and the control PC 42 has been described, but the present invention is not limited thereto. For example, a mode in which an information processing device having the functions of the user PC 40 and the control PC 42 is connected to the 3D printer 10 may be adopted.

Effects of the Embodiments (1) The shaping apparatus 1 of the present embodiment includes an inkjet head 20 that forms one shaped layer by performing a plurality of main scans of ejecting an ink droplet of a curable ink that cures according to light of a predetermined wavelength toward a shaping table 16 while reciprocating in a main scanning direction defined in advance; a light source 22 that is provided at least at one position on a front side in a forward direction or a return direction in the main scan with respect to the inkjet head 20 and irradiates an ink dot formed by the ink droplet with the light; and a flattening roller 23 that flattens an upper surface of the ink dot; where in the shaping apparatus 1 that forms the shaped object 30 by layering the shaped layer, the ink dot is flatted by the flattening roller 23 in the return movement without completely curing the ink dot by controlling the on/off state or illuminance of the light source 22 at the time of at least one main scan among the plurality of main scans.

According to the present embodiment, by controlling the on/off state or the illuminance of the light source 22, the upper surface of the ink dot before the ink dot is completely cured, that is, a soft state to an extent the ink dot does not flow but is scraped off by the flattening roller 23 is flattened by the flattening roller 23, so the amount of ink scraps generated at the time of flattening can be easily suppressed.

(2) The shaping apparatus 1 of the present embodiment includes a left light source 22A that is provided on the forward side in the main scanning direction with respect to the inkjet head 20 and irradiates the ink dot formed by the ink droplet landed on the shaping table 16 with light, and a right light source 22B that is provided on the return side in the main scanning direction with respect to the inkjet head 20 and irradiates the ink dot with light, where the right light source 22B is not turned on when the inkjet head 20 ejects the ink droplet while moving forward. According to the present embodiment, the generation of ink scraps can be easily suppressed since the upper surface of the ink dot in the non-cured state is flattened by the flattening roller 23.

(3) In the shaping apparatus 1 of the present embodiment, the right light source 22B is turned on at an illuminance at which the ink dot becomes a semi-cured state in at least one of the forward movement of the inkjet head 20 and the return movement of the inkjet head 20. According to the present embodiment, the generation of ink scraps can be easily suppressed since the upper surface of the ink dot in the semi-cured state is flattened by the flattening roller 23.

(4) According to the shaping apparatus 1 of the present embodiment, the semi-cured state is a cured state of an extent the ink dot landed on the shaping table 16 does not flow.

(5) Therefore, according to the shaping apparatus 1 of the present embodiment, in at least the last reciprocating movement in the main scanning direction with respect to each position of the shaped layer, the ink dot is not completely cured by controlling the on/off state or the illuminance of the right light source 22B, and the ink dot is cured by the left light source 22A after the ink dot is flattened by the flattening roller 23 in the return movement. According to the present embodiment, even when the shaped object 30 is formed through the multi-pass method, the generation of ink scraps of the shaped object 30 can be easily suppressed while suppressing the smearing of the color of the shaped object 30.

(6) In the shaping apparatus 1 of the present embodiment, the light source 22 cures the ink dot after the flattening roller 23 flattens the ink dot in the return movement.

(7) According to the shaping apparatus 1 of the present embodiment, the forward movement or the return movement of the main scan is performed at least three times or more with respect to each position of the shaped layer.

(8) According to the shaping apparatus 1 of the present embodiment, the inkjet head 20 uniformly ejects the clear ink with respect to the shaped object 30 so as to compensate for the layering amount by the color ink for coloring and forming the shaped object 30, where the compensation amount of the clear ink by one ejection from the inkjet head 20 is an amount smaller than the maximum amount of the color ink by one ejection from the inkjet head 20. According to the present embodiment, the generation of ink scraps of the shaped object 30 can be easily suppressed when forming the shaped object 30 through the multi-pass method.

(9) According to the shaping apparatus 1 of the present embodiment, the compensation amount of the clear ink is a value obtained by subtracting the amount of ink scraped off by the flattening roller 23 from the shaped object 30 formed with the compensation amount of the clear ink set to an amount same as the maximum amount of the color ink, from the maximum amount of color ink. According to the present embodiment, the generation of ink scraps of the shaped object 30 can be easily suppressed without causing defects in the shaped object 30.

INDUSTRIAL APPLICABILITY

The present invention relates to a shaping apparatus that forms a three-dimensional object by ejecting ink.

The invention claimed is:
1. A shaping apparatus comprising:
a controller, comprising a processor;
an inkjet head that forms one shaped layer by performing a plurality of main scans of ejecting an ink droplet of a curable ink that cures according to light of a prede- termined wavelength toward a shaping table while reciprocating in a main scanning direction defined in advance;

a light source that is provided at least at one position on a front side in a forward direction or a return direction of the plurality of main scans with respect to the inkjet head and irradiates an ink dot formed by the ink droplet with the light; and a flattening unit, comprising a roller, that flattens an upper surface of the ink dot; the shaping apparatus forming a shaped object by layering the shaped layer, wherein a cured state of the ink dot varies according to a degree of illuminance of the ink dot by the light, wherein the processor is configured to control the light source to adjust the degree of illuminance of the ink dot by the light without completely curing the ink dot by controlling an on/off state or illuminance of the light source at a time of at least one main scan among the plurality of main scans, such that the ink dot is cured to a semi-cured state in which the ink dot, which has landed, does not flow, wherein the flattening unit is configured to flatten the ink dot that is cured to the semi-cured state in which the ink dot, which has landed, does not flow.

2. The shaping apparatus as set forth in claim 1, further comprising:

a first light source that is provided on a forward side in the main scanning direction with respect to the inkjet head and irradiates the ink dot formed by the ink droplet, which has landed; and a second light source that is provided on a return side in the main scanning direction with respect to the inkjet head and irradiates the ink dot formed by the landed ink droplet with the light, wherein the second light source is not turned on when the inkjet head ejects the ink droplet while moving forward.

3. The shaping apparatus as set forth in claim 2, wherein a forward movement or a return movement of the main scan is performed at least three times or more with respect to each position of the shaped layer, and in at least a last reciprocating movement in the main scanning direction with respect to each position of the shaped layer, the ink dot is cured by the first light source after the flattening unit flattens the ink dot in the return movement without completely curing the ink dot by controlling the on/off state or the illuminance of the second light source.

4. The shaping apparatus as set forth in claim 1, further comprising:

a first light source that is provided on a forward side in the main scanning direction with respect to the inkjet head and irradiates the ink dot formed by the ink droplet, which has landed; and a second light source that is provided on a return side in the main scanning direction with respect to the inkjet head and irradiates the ink dot formed by the landed ink droplet with the light, wherein the second light source is turned on at an illuminance such that the ink dot becomes the semi-cured state in at least one of a forward movement of the inkjet head and a return movement of the inkjet head.

5. The shaping apparatus as set forth in claim 4, wherein the forward movement or the return movement of the main scan is performed at least three times or more with respect to each position of the shaped layer, and in at least a last reciprocating movement in the main scanning direction with respect to each position of the shaped layer, the ink dot is cured by the first light source after the flattening unit flattens the ink dot in the return movement without completely curing the ink dot by controlling the on/off state or the illuminance of the second light source.

6. The shaping apparatus as set forth in claim 1, wherein after the flattening unit flattens the ink dot in a return movement, the ink dot is cured by the light source.

7. The shaping apparatus as set forth in claim 1, wherein a forward movement or a return movement of the main scan is performed at least three times or more with respect to each position of the shaped layer.

8. The shaping apparatus as set forth in claim 1, wherein the inkjet head uniformly ejects a clear ink with respect to the shaped object so as to compensate for a layering amount by a color ink for coloring and forming the shaped object, and a compensation amount of the clear ink by one ejection from the inkjet head is an amount smaller than a maximum amount of the color ink by one ejection from the inkjet head.

9. The shaping apparatus as set forth in claim 8, wherein the compensation amount of the clear ink is a value obtained by subtracting an amount of ink scraped off by the flattening unit from the shaped object formed with the compensation amount of the clear ink set to an amount which is the same as the maximum amount of the color ink, from the maximum amount of the color ink.

10. A shaping method using the shaping apparatus as set forth in claim 1, the shaping method comprising:

a step in which the ink dot is flattened by the flattening unit in a return movement is repeated without completely curing the ink dot by controlling the on/off state or illuminance of the light source at the time of the at least one main scan among the plurality of main scans to layer the shaped layer and form the shaped object.

* * * * *